No. 671,746. Patented Apr. 9, 1901.
F. J. BALL.
VARIABLE SPEED GEARING.
(Application filed Nov. 28, 1900.)
(No Model.) 2 Sheets—Sheet 1.
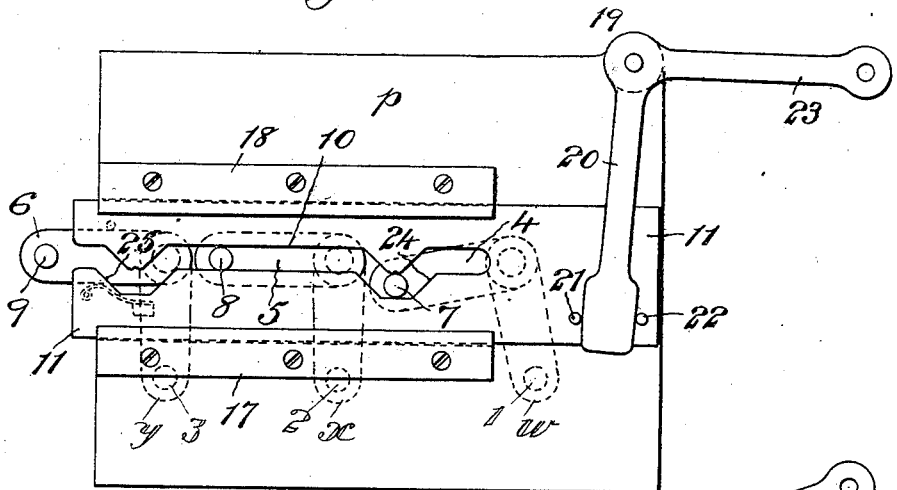
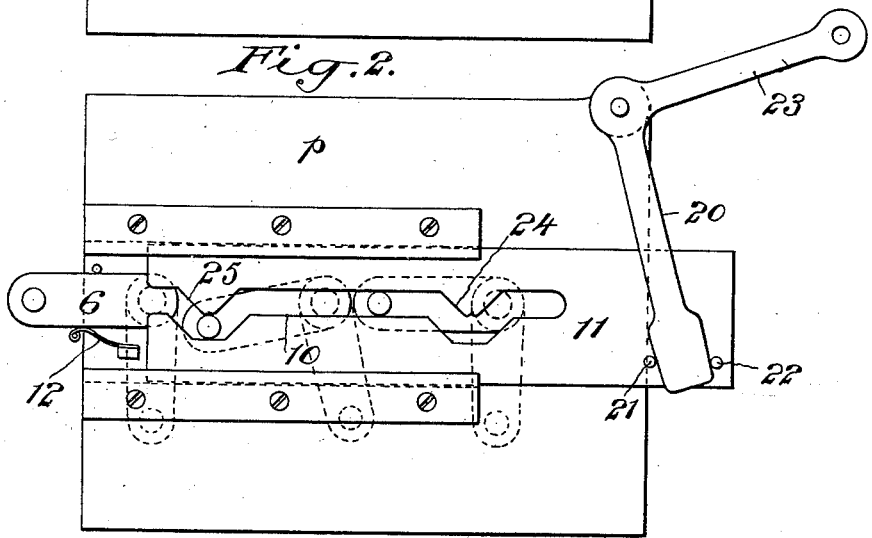
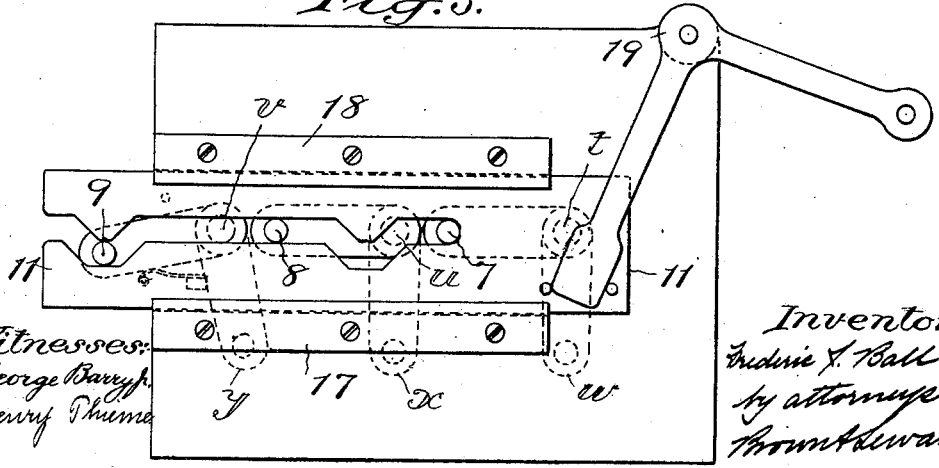

No. 671,746. Patented Apr. 9, 1901.
F. J. BALL.
VARIABLE SPEED GEARING.
(Application filed Nov. 28, 1900.)
(No Model.) 2 Sheets—Sheet 2.
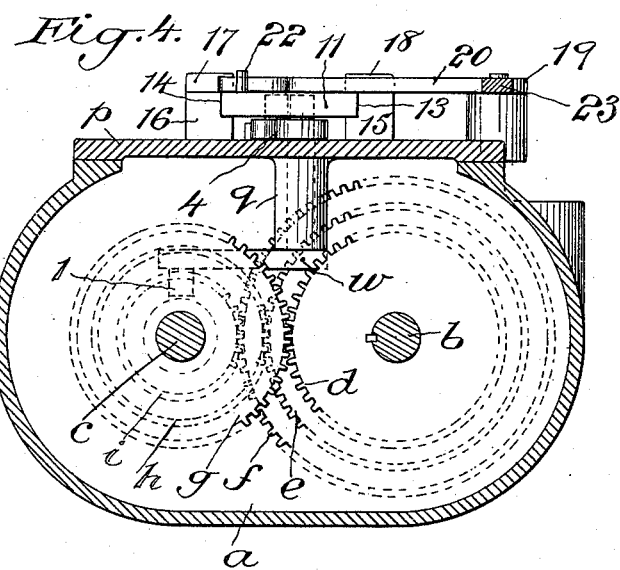
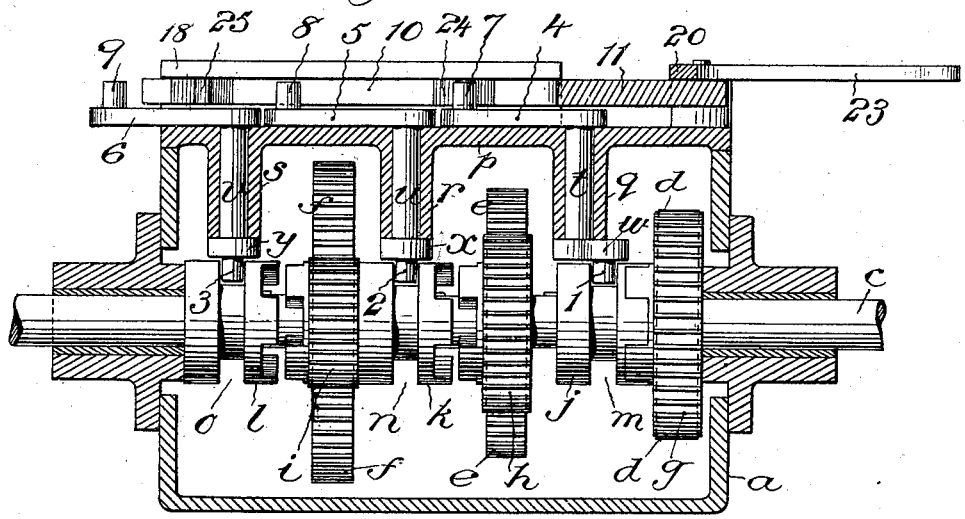
Witnesses:
George Barry Jr
Henry Phinne
Inventor:
Frederic J. Ball
by attorneys

UNITED STATES PATENT OFFICE.

FREDERIC J. BALL, OF BROOKLYN, NEW YORK.

VARIABLE-SPEED GEARING.

SPECIFICATION forming part of Letters Patent No. 671,746, dated April 9, 1901.

Application filed November 28, 1900. Serial No. 37,955. (No model.)

*To all whom it may concern:*

Be it known that I, FREDERIC J. BALL, a citizen of the United States, and a resident of the borough of Brooklyn, in the city and State of New York, have invented a new and useful Improvement in Variable-Speed Gearing, of which the following is a specification.

My invention relates to an improvement in variable-speed gearing which is more particularly applicable for use in connection with motor-vehicles, the object being to provide a very simple, compact, and efficient means for connecting gears of varying sizes between the drive-shaft and the driven shaft, whereby the driven shaft may be rotated at varying speeds while the drive-shaft is rotated at a constant speed.

A practical embodiment of my invention is represented in the accompanying drawings, in which—

Figure 1 represents a top plan view of certain parts of the variable-speed mechanism, showing the parts in the positions which they assume when the gears of substantially equal size are connected. Fig. 2 represents a similar view showing the positions which the parts assume when the set of gears for driving the driven shaft at the next lower speed is connected with the drive-shaft. Fig. 3 is a similar view showing the positions which the parts assume when the set of gears which drive the driven shaft at the lowest speed is connected with the drive-shaft. Fig. 4 is a transverse section looking toward the interior of the casing for containing the transmission-gears, and Fig. 5 is a vertical longitudinal view through the mechanism.

$a$ represents a hollow casing in which are mounted in suitable bearings a drive-shaft $b$ and a driven shaft $c$. The drive-shaft $b$ is provided within the casing $a$ with three spur-gears $d\ e\ f$ of varying sizes. These gears are fixed to rotate with the drive-shaft $b$ and intermesh with three gears $g$, $h$, and $i$ of varying sizes, mounted loosely on the driven shaft $c$.

Three clutches $j$, $k$, and $l$ are mounted to slide longitudinally on the driven shaft $c$ and have a feather-and-groove connection therewith, so that they are rotated by the said shaft. These clutches are provided with annular grooves $m$, $n$, and $o$, respectively, which are engaged by the bell-crank levers to be hereinafter described.

The top or cover $p$ of the casing $a$ is provided with three downwardly-extended hollow studs $q$, $r$, and $s$, which form extended bearings for the pivot-pins $t$, $u$, and $v$ of bell-crank levers. The lower ends of these pivot-pins $t$, $u$, and $v$ are provided with laterally-extended arms $w$, $x$, and $y$, having downwardly-extended studs 1, 2, and 3 at their free ends, which studs are located at all times in their respective annular grooves $m$, $n$, and $o$ in the clutches on the driven shaft $c$. The upper ends of the said pivot-pins are provided with longitudinally-extended arms 4, 5, and 6, which are mounted to rock upon the flat surface of the cover $p$. These upper arms 4, 5, and 6 of the bell-crank levers are provided at their free ends with upwardly-extended studs 7, 8, and 9, which are arranged to be engaged by a cam-groove 10 in a longitudinally-reciprocating plate 11. The cam-groove 10 in the sliding or reciprocating plate 11 opens through one end of the said plate. The studs 7 and 8 on the upper arms 4 and 5 of two of the bell-crank levers are at all times engaged by the cam-groove, so that the said two bell-crank levers are positively moved in both directions to slide their respective clutches into and out of engagement with their corresponding gears. The stud 9 on the upper arm 6 of the third bell-crank lever is yieldingly held in a position to keep its clutch out of engagement with its corresponding gear by means of a spring 12, mounted on the cover $p$ of the casing underneath the sliding plate 11. The opposite side edges of the sliding plate are mounted in U-shaped grooves 13 14, formed by providing L-shaped grooves in blocks 15 and 16 and overlapping strips 17 and 18. These blocks and strips extend along the cover $p$ of the casing upon opposite sides of the upper arms of the bell-crank levers, the U-shaped grooves being formed along the inner sides of the said blocks and strips at points a slight distance above the said arms, so that the arms may be freely moved laterally underneath the sliding plate 11 when the said plate is moved longitudinally.

In the accompanying drawings I have shown a rocking lever 19 for sliding the plate 11 longitudinally, one arm 20 of the said lever engaging two upwardly-extended pins 21 22 on the said plate and the other arm 23 of the lever being fitted to be engaged by any suitable operating connection.

The cam-groove 10 in the sliding plate 11 is provided with two V-shaped bends 24 25, which are so spaced apart that when the bar is slid from the limit of its movement in one direction to the limit of its movement in the other direction all the clutches are disengaged before any one particular clutch is brought into engagement with its corresponding gear.

In the construction hereinabove described it will be seen that the pivot-pins of the bell-crank levers are provided with extended bearings, thus reducing the strain upon the bell-crank levers to a minimum when the driving mechanism is in operation. It will further be seen that the upper arms of the bell-crank levers rest upon the cover of the casing, thus still further strengthening the said levers. This is the part of the driving mechanism when used in a motor-vehicle or for any other use which receives the greatest strain and wear.

The blocks 15 and 16, carried by the cover of the casing, serve to support the sliding plate 11 very strongly in position and take up all lateral strain which is imparted thereto when the several levers are rocked to throw their respective clutches into and out of engagement with their corresponding gears.

It will also be seen that the wearing parts of the mechanism are well protected, the hollow casing *a* making it feasible to run the gears in oil.

What I claim is—

1. A variable-speed gearing comprising two shafts, sets of intermeshing gears, one gear of each set being fixed to rotate on one shaft and the other gear of each set being free to rotate on the other shaft, clutches for connecting and disconnecting the loose gears and their supporting-shafts, a plurality of levers for operating said clutches and a sliding plate having a single cam-groove therein opening through the end of the plate for positively operating the several levers, the groove being at all times in engagement with certain of the levers and being fitted to be brought into engagement with another of the levers when the plate is moved to the limit of its movement in one direction, substantially as set forth.

2. A variable-speed gearing comprising a hollow casing, two shafts mounted therein, sets of intermeshing gears, one gear of each set being fixed to rotate on one shaft and the other gear of each set being free to rotate on the other shaft, clutches for connecting and disconnecting the loose gears and their supporting-shaft, a plurality of bell-crank levers pivoted in the casing and having their lower arms within the casing in engagement with the said clutches and their upper arms exterior to the said casing and a sliding plate having a cam-groove therein arranged to engage the upper arms of the said levers for swinging them as the sliding plate is moved, substantially as set forth.

3. A variable-speed gearing comprising a hollow casing, two shafts mounted to rotate therein, sets of intermeshing gears, one gear of each set being fixed to rotate on one shaft and the other gear of each set being free to rotate on the other shaft, clutches for connecting and disconnecting the loose gears and their supporting-shaft, elongated bearings in the casing, bell-crank levers having their pivot-pins mounted in said elongated bearings, clutch-engaging arms secured to the inner ends of said pivot-pins, a sliding plate mounted on the casing and having a cam-groove therein and cam-engaging arms fixed to the outer ends of the said pivot-pins, substantially as set forth.

4. A variable-speed gearing comprising a casing, two shafts mounted to rotate therein, sets of intermeshing gears, one gear of each set being fixed to rotate on one shaft and the other gear of each set being free to rotate on the other shaft, clutches for connecting and disconnecting the loose gears and their supporting-shaft, guides mounted on the exterior of the casing, a plate fitted to slide longitudinally in said guides, the said plate being provided with a cam-groove therein and bell-crank levers mounted in the casing having their lower arms engaged with the said clutches and their upper arms located between the sliding plate and the casing and engaging the cam-groove in the sliding plate whereby the clutches are positively moved into and out of engagement with the loose gears as the plate is slid, substantially as set forth.

In testimony that I claim the foregoing as my invention I have signed my name, in presence of two witnesses, this 23d day of November, 1900.

FREDERIC J. BALL.

Witnesses:
 FREDK. HAYNES,
 HENRY THIEME.